US005875407A

United States Patent [19]
Pereira

[11] Patent Number: 5,875,407
[45] Date of Patent: Feb. 23, 1999

[54] METHOD FOR SYNTHESIZING POLLUCITE FROM CHABAZITE AND CESIUM CHLORIDE

[75] Inventor: Candido Pereira, Naperville, Ill.

[73] Assignee: The United States of America as represented by the United States Department of Energy, Washington, D.C.

[21] Appl. No.: 908,052

[22] Filed: Aug. 11, 1997

[51] Int. Cl.$^6$ .................................................. G21F 9/00
[52] U.S. Cl. ................ 588/10; 588/11; 588/14; 210/682
[58] Field of Search ................ 588/10, 11, 14; 210/682

[56] References Cited

U.S. PATENT DOCUMENTS

| H1227 | 9/1993 | Lewis et al | 252/628 |
|---|---|---|---|
| 3,849,330 | 11/1974 | Isaacson et al. | |
| 3,959,172 | 5/1976 | Brownell et al. | |
| 4,376,792 | 3/1983 | Angelini et al. | 427/6 |
| 4,808,318 | 2/1989 | Komarneni et al. | 210/682 |
| 5,094,677 | 3/1992 | Morena | 65/18.1 |
| 5,192,722 | 3/1993 | Bedard et al. | 501/128 |
| 5,340,506 | 8/1994 | Koyama | 588/14 |
| 5,591,420 | 1/1997 | Balmer | 423/700 |
| 5,613,240 | 3/1997 | Lewis et al. | 588/11 |

OTHER PUBLICATIONS

H. Mimura, M. Shibata, and K. Akiba, *"Hydrothernal reactions of Zeolites Loaded with Cesium or Strontium,"* J. of Nucl. Science and Tech., 27, 1990, p. 835.

H. Mimura, M. Shibata, and K. Akiba, *"Surface Alteration of Pollucite under Hydrothermal Conditions,"* J. of Nucl. Science and Tech., 27, 1990, p. 835.

K. Yanagisawa, M. Nishioka, N. Yamassaki, *"Immobilization of Cesium into Pollucite Structure by Hydrothermal Hot–Pressing,"* J. of Nuclear Science and Tech., 24, 1987, p.51.

K. Yanagisawa, S. Kanahara, M. Nishioka, and N. Yamasaki, *"Immobilization of Radioactive Wastes in Hydrothermal Synthetic Rock (II),"* J. of Nuclear Science and Tech., 21, 1984, p. 68.

S. Gallagher and J. McCarthy, "Prepration and X–ray Characterization of Pollucite ($CsAlSi_2O_6$), "Nucl. Chem., vol. 43, 1981, p. 1773–1777.

H. Mimura and T. Kanno, "Distribution and Fixation of Cesium and Strontium in Zeolite A and Chabazite, "J. of Nuclear Science and Tech., 22, 1985, p. 36.

*Primary Examiner*—Ngoclan Mai
*Attorney, Agent, or Firm*—Mark P. Dvorscak; Lisa M. Soltis; William R. Moser

[57] ABSTRACT

A method for immobilizing waste chlorides salts containing radionuclides and hazardous nuclear material for permanent disposal, and in particular, a method for immobilizing waste chloride salts containing cesium, in a synthetic form of pollucite. The method for synthesizing pollucite from chabazite and cesium chloride includes mixing dry, non-aqueous cesium chloride with chabazite and heating the mixture to a temperature greater than the melting temperature of the cesium chloride, or above about 700° C. The method further comprises significantly improving the rate of retention of cesium in ceramic products comprised of a salt-loaded zeolite by adding about 10% chabazite by weight to the salt-loaded zeolite prior to conversion at elevated temperatures and pressures to the ceramic composite.

18 Claims, 3 Drawing Sheets

METHOD FOR SYNTHESIZING POLLUCITE FROM CHABAZITE AND CESIUM CHLORIDE

CONTRACTUAL ORIGIN OF THE INVENTION

The United States Government has rights in this invention pursuant to Contract Number W-31-109-ENG-38 between the United States Government and Argonne National Laboratory.

BACKGROUND OF INVENTION

1. Field of Invention

The present invention relates to a method for immobilizing waste chlorides salts containing radionuclides and hazardous nuclear material for permanent disposal, and, in particular, a method for immobilizing waste chloride salts containing cesium, in a synthetic form of pollucite.

2. Description of Related Art

Electrorefining methods involving electrochemical cells are used for the recovery of fissionable materials from spent nuclear reactor fuels, including uranium and plutonium. Typically, in an electrorefining cell, an electrolyte consisting of a molten eutectic salt mixture, such as KCl and LiCl, is used to transport the metal or metals to be purified between electrode solutions. When used to treat spent nuclear reactor fuels, the salt mixture becomes contaminated with radionuclides (e.g., $^{-137}$cesium and $^{-90}$strontium), hazardous materials (e.g., barium), and other species (e.g., sodium and $^{-129}$iodine). Eventually, the salt mixtures are no longer suitable for use in the electrorefining cell.

Since the separation of cesium and strontium from the salt is difficult, the cesium and strontium, and any other radionuclides and toxic metal chlorides and iodides, are disposed along with a portion of the salt matrix. The waste salt containing the cesium and strontium is a high level waste (HLW) which must be deposited in an HLW geologic repository. To prevent an uncontrolled release of the radionuclides and other hazardous chemicals into the groundwater, the waste form must be leach resistant. Due to the very high water solubility of the waste salts, a method for encapsulating and immobilizing the waste salt is required.

The high solubility and volatility of cesium, in particular, has caused difficulties in the identification and preparation of suitable waste forms which would immobilize cesium for the necessary, extended storage time. For example, incorporation of cesium into traditional solid waste forms, including borosilicate glass, synroc, cement, or ceramics, is ineffective due to the relatively high leach rates resulting from the inherently high solubility of cesium and difficulties during processing requiring additional steps. For example, immobilizing cesium in a glass matrix involves converting the waste chloride salts into oxides or other chemical forms compatible with the glass-making process. These conversion processes are expensive and time-consuming, and restructuring the materials to form the glass requires temperatures of about 1000° C., which increases the risk of volatilizing the cesium.

Ion-exchangers are an important class of materials used for the immobilization of cesium in salt solutions and molten salts. Certain cation exchange resins and various cation exchangers, such as naturally occurring and synthetic zeolites (tectosilicate mineral), are available for selectively recovering cesium from contaminated solutions. For example, zeolite matrices, including zeolite A, zeolite X, and chabazite, have been used to immobilize waste chloride salts containing cesium because of their sorption and ion exchange properties. U.S. Statutory Invention Registration H1227 discloses contacting molten waste chloride salt containing cesium with dehydrated zeolite A and maintaining the contact to allow the salt to penetrate the zeolite cavities. The salt is occluded in the zeolite and the cesium in the non-occluded salt is sorbed by ion-exchanging with the cations in the zeolite or the occluded salt, resulting in a leach resistant aluminosilicate matrix, wherein the cesium ions are present as either aluminosilicates or as occluded salt molecules. U.S. Pat. No. 4,808,318 further describes the use of a hydrated sodium phlogopite mica (phyllosilicate mineral) to recover cesium ions from waste solutions, whereby the cesium is selectively absorbed by the modified phlogopite and fixed for long-term storage.

Although methods for immobilizing cesium using ion-exchange materials can effectively purify the salt, the non-occluded surface salt must be removed from the ion-exchanger before it can be stored. In addition, if the cesium is in the form of dry, solid cesium chloride, the cesium chloride must first be dissolved in solution before being ion exchanged into a zeolite. Impurities in the solution, such as the presence of competing sodium and/or potassium ions, may also decrease the zeolite capacity for cesium. Problems are encountered in making dense, leach-resistant waste forms directly from the salt-occluded waste product, and further steps are generally required to immobilize the cesium in the ion-exchange matrix, including calcination at high temperatures or incorporation of either the cesium ions eluted from the zeolite or the zeolite containing the cesium ions into a storage medium, such as glass or cement.

A preferred method of disposing of radionuclides is by encapsulation in specific crystalline, mineral waste forms, such as sodalite and pollucite, because of their refractory properties and high resistance against leaching. Generally, these methods include mixing the radioactive ions with inorganic materials and applying heat and/or pressure to form the synthetic mineral. U.S. Pat No. 5,340,506 discloses forming a sodalite intermediate from alumina, silica, and sodium hydroxide, and mixing the sodalite intermediate with either waste salt or waste salt which has been contacted with zeolite to concentrate the radionuclides. The mixture is compacted under heat and pressure conditions to form sodalite, whereby the waste salt and radionuclides are trapped within the sodalite cage structure. U.S. Pat. No. 5,613,240 further discloses a method for producing sodalite from salt occluded zeolites by the use of heat or heat and pressure in the presence of glass. The method involves heating substantially dry zeolite, waste chloride salts, and glass to a temperature up to about 725° C. to convert the zeolite to sodalite, and thereafter maintaining the sodalite at a pressure and temperature sufficient to form a sodalite product.

Pollucite ($CsAlSi_2O_6$), a naturally occurring aluminosilicate containing cesium, is known to be one of the best crystalline waste forms for the containment of radioactive cesium, and, therefore, is a component of several mineral-based nuclear waste forms, such as synroc. Pollucite has a high loading of cesium, high thermal stability, and a high resistance to leaching.

Synthetic pollucite has been produced for immobilizing radioactive ions by aqueous hydrothermal processes and high temperature synthesis, both involving an ion exchange step. Hydrothermal transformation and recrystallization of zeolites, specifically zeolite A, zeolite X, and zeolite Y, which have been loaded with cesium in an ion exchange step, occurs in the presence of water vapor at temperatures and pressures between about 260° C. to 300° C. and 10 to 30 MPa, respectively. However, cesium loaded chabazite subjected to hydrothermal processes reportedly results in the formation of zeolite and not a new mineral phase, such as pollucite. Pollucite has also been produced by the hydrothermal reaction of cesium with siliceous sinter in a sodium hydroxide solution. High temperature synthesis involves subjecting ion-exchanged and cesium loaded zeolite to calcination at temperatures of about 1,200° C. to produce synthetic pollucite. Dense waste forms are further produced by calcination followed by sintering or by hot pressing.

U.S. Pat. No. 5,591,420 discloses a new material: cesium titanium silicate pollucite ($CsTiSi_2O_{6.5}$ or $Cs_2Ti_2Si_4O_{13}$), which represents a new class of crystalline phase of Ti-containing zeolites, wherein the cages formed within the compound trap the cesium ions. The method of making the silicotitanate pollucite involves a one-step, direct thermal conversion at low temperatures (700° C. to 1000° C.), which minimizes the risk of volatilizing the cesium and reduces waste volumes. The cesium titanium silicate materials are made by selecting and combining proportions of cesium, silica, and titania, and heat treating the mixture. The components can be combined either by mixing oxides or carbonates of cesium, titanium, and silicon, or by synthesizing and hydrolyzing precursor materials. The resulting compounds are durable glass and ceramic materials, exhibiting low leach rates.

Problems associated with the current methods of synthesizing pollucite are high temperature requirements, which may cause volatilization and loss of the cesium, numerous process steps that increase the cost of immobilizing the cesium, and insufficient leach resistance of the storage material. In addition, cesium titanium silicate pollucite is thermally unstable and difficult to produce on a large scale.

A need exists for a method for immobilizing cesium for long term storage by incorporating the cesium into synthetic pollucite which overcomes the problems experienced in the prior art.

The present method is a simple, one step conversion process for synthesizing pollucite that eliminates the need for aqueous ion exchange and/or hydrothermal synthesis at elevated temperatures and pressures. This reduces the number of waste streams. Since the solid cesium chloride is converted to pollucite without the need to dissolve the cesium chloride in solution to perform an ion exchange step, this method can be used in conjunction with other dry processing technologies, such as pyroprocessing.

The present method for synthesizing pollucite includes mixing dry, non-aqueous cesium chloride with chabazite and heating the mixture to a temperature greater than the melting temperature of the cesium chloride (approximately 680° C.), or above about 700° C. The unexpected and surprising result is that pollucite forms in the presence of the chloride ion. In particular, the chloride appears to remain in the structure of the pollucite, apparently occluded as sodium chloride. The method significantly improves the rate of retention of cesium in ceramic products comprised of a salt-loaded zeolite by adding about 10% chabazite by weight to the salt-loaded zeolite prior to conversion at elevated temperatures and pressures to the ceramic composite.

Therefore, in view of the above, a basic object of the present invention is to provide a simpler method for immobilizing radioactive cesium for long term storage.

A further object of this invention is to provide a method for immobilizing radioactive cesium eliminating the need for hydrothermal synthesis which involves an aqueous ion exchange step for isolation of the cesium ion. In addition, the method is practiced at low temperatures, reducing the risk of loss of cesium.

Another object of this invention is to provide a method for immobilizing radioactive cesium by mixing non-aqueous cesium chloride with chabazite and heating the mixture to a temperature sufficient to form pollucite.

Yet another object of the invention is to provide a method for immobilizing radioactive cesium in a glass product including mixing non-aqueous cesium chloride with chabazite, heating the mixture to a temperature sufficient to form pollucite, cooling the pollucite, and heating the pollucite with glass to a temperature sufficient to form a glass pollucite product.

Yet another object of the invention is to provide a method for immobilizing radioactive cesium which includes mixing a predetermined amount of chabazite with cesium chloride and zeolite A to form a mixture of aluminosilicates, including pollucite.

Yet another object of the invention is to significantly improve the rate of retention of cesium in ceramic products comprised of a salt-loaded zeolite by adding about 10% chabazite by weight to the salt-loaded zeolite prior to its conversion at elevated temperatures and pressures to the ceramic composite.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

The present invention relates to a method for immobilizing waste chloride salts containing radionuclides and hazardous nuclear material for permanent disposal, and, in particular, a method for immobilizing waste chloride salts containing cesium, in a synthetic form of pollucite.

Briefly, the method for synthesizing pollucite from chabazite and cesium chloride includes mixing dry, non-aqueous cesium chloride with chabazite and heating the mixture to a temperature greater than the melting temperature of the cesium chloride, or above about 700° C. The unexpected and surprising result of the method is that pollucite forms in the presence of the chloride ion. In particular, the chloride remains in the structure of the pollucite, apparently occluded as sodium chloride. Thus, the ion exchange step, wherein cesium is separated from the chloride ion, prior to conversion to the waste product is unnecessary.

In an alternate embodiment, the method for synthesizing pollucite from chabazite and cesium chloride includes mixing dry, non-aqueous cesium chloride with zeolite A to form a pollucite/sodalite product.

The method, further, significantly improves the rate of retention of cesium in ceramic products comprised of a salt-loaded zeolite by adding about 10% chabazite by weight to the salt-loaded zeolite prior to its conversion at elevated temperatures and pressures to the ceramic composite.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a method for immobilizing waste chloride salts containing radionuclides and hazardous nuclear material for permanent disposal, and, in particular, a method for immobilizing waste chloride salts containing cesium, in a synthetic form of pollucite.

Zeolite is a tectosilicate mineral comprised of $SiO_4$ and $AlO_4$, with large vacant spaces within its crystalline structure for cations. Chabazite ($NaAlSi_2O_6$), a mineral within the zeolite group, is ideal for pollucite formation because the silicon to aluminum ratio of chabazite is identical to that of pollucite ($CsAlSi_2O_6$), that is, the ratio of silicon to aluminum in chabazite and pollucite is (Si:Al=2). Another advantage is the commercial availability of the chabazite.

Figure 1:
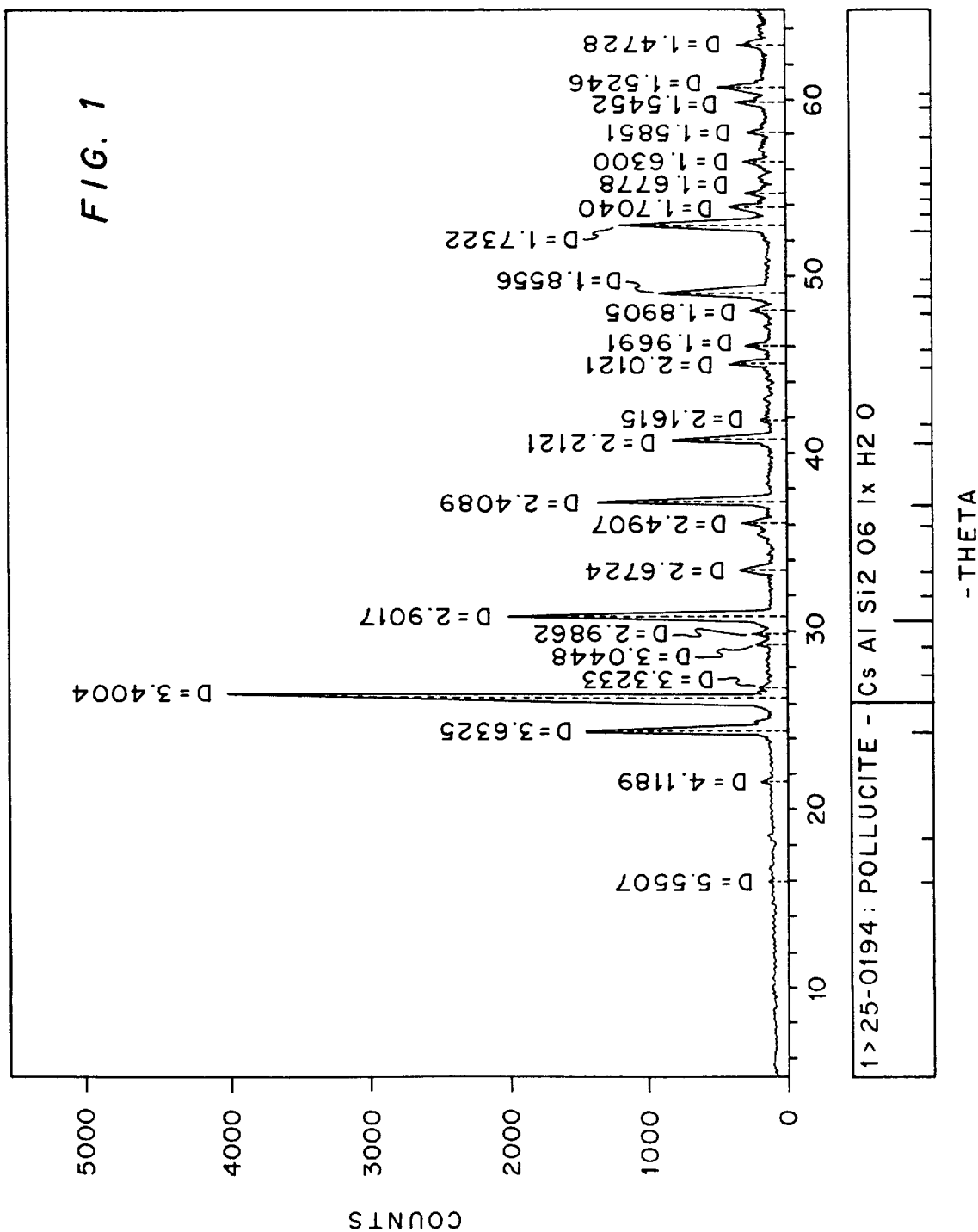
FIG. 1 shows an x-ray diffraction pattern of a pollucite product.

The method is a one-step, direct thermal conversion at low temperatures of cesium, in the form of dry, non-aqueous cesium chloride, to pollucite by mixing and heating the cesium chloride with chabazite. The cesium is ion-exchanged and a reaction occurs to form pollucite in a single heat treatment step. The combination of cesium chloride and chabazite is heated to above the melting point of CsCl, or above about 700 ° C., forming pollucite. For example, a mixture of CsCl and chabazite was combined at ambient temperature, in a ratio of about 0.6 g of CsCl to 1 g of chabazite, the mixture having a cesium to aluminum ratio of 0.5. The mixture was heated in an alumina crucible to a temperature above 700° C. to form the pollucite product. Analysis of the pollucite revealed a complete conversion of the CsCl to pollucite, with no NaCl or CsCl evident as by-products of the conversion process. FIG. 1 shows an x-ray diffraction pattern of the pollucite produced. Surprisingly, pollucite forms in the presence of the chloride ion. In particular, chloride ion appears to remain in the structure of the pollucite, apparently occluded as sodium chloride.

Importantly, the method does not involve an aqueous ion exchange step, elevated temperatures (about 1000° C.) and pressures, or complex starting materials and processing steps, as required by prior art methods. An advantage of the invention, therefore, is the ability to convert dry, solid cesium chloride without dissolving the cesium chloride in an aqueous solution to perform an ion exchange step. The solid cesium chloride is substantially dry, meaning dry to a great extent or degree, or being largely but not necessarily wholly without moisture. In other words, the cesium chloride is to a great extent free or relatively free of liquid, especially water. Thus, the method can be used with processes that require very dry environments, such as pyrochemical processes.

Table 1 provides composition data for chabazite prior to mixing with cesium chloride, and the final, synthesized pollucite. The values are presented as mole/mole of Al. In particular, the retention of cesium and sodium in the pollucite is 0.922 and 0.587, respectively.

TABLE 1

| Sample | Al | Si | Na | Ca | Cs |
|---|---|---|---|---|---|
| Pollucite | 1.000 | 3.663 | 0.587 | 0.058 | 0.922 |
| Chabazite | 1.000 | 3.633 | 1.393* | 0.019 | 0.002 |

*Chabazite was ion exchanged in 1 M NaCl at 90° C.

Figure 2:
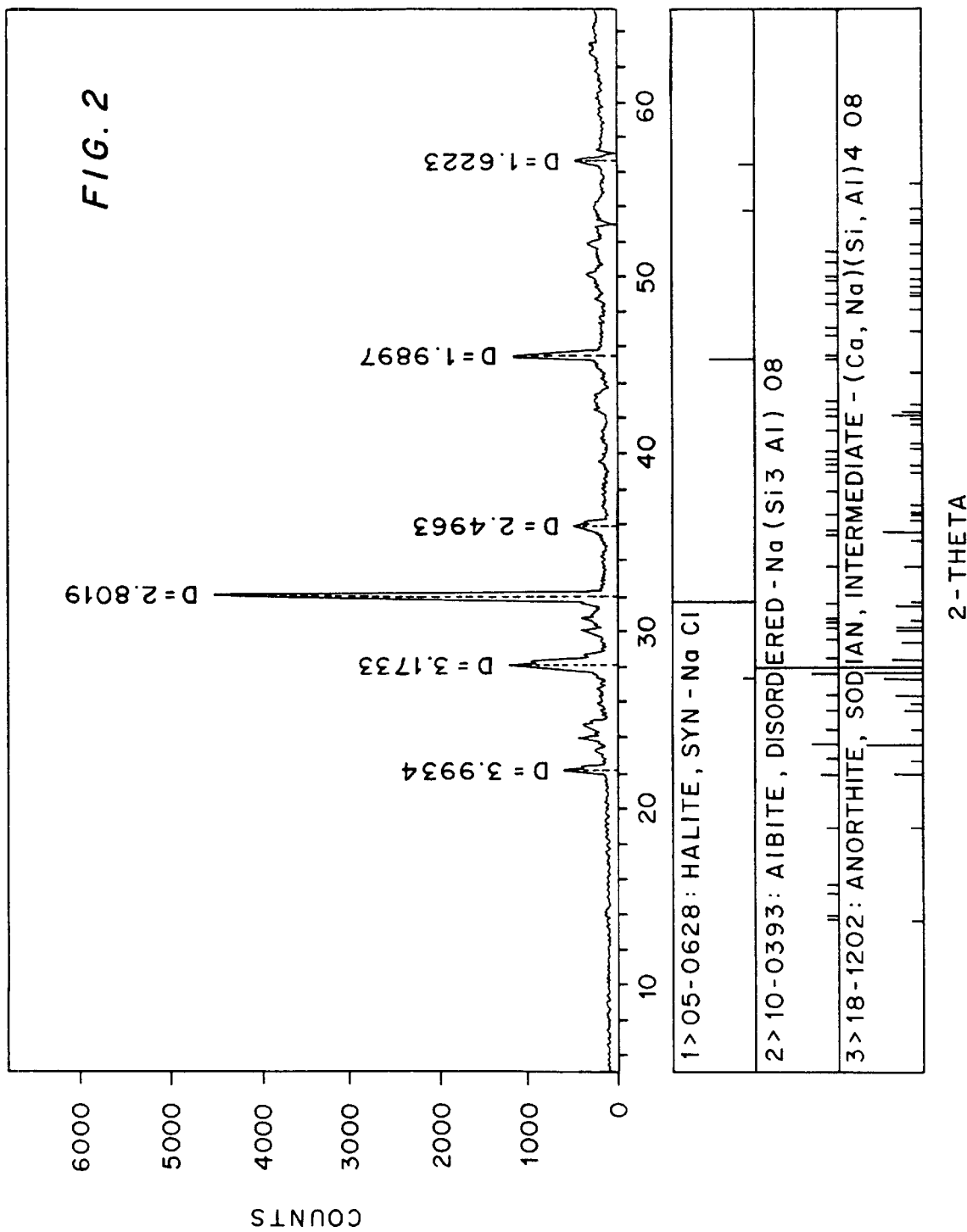
FIG. 2 shows an x-ray diffraction pattern of the product comprised albite or anorthite feldspars.

Importantly, mixtures of sodium chloride and chabazite do not result in conversion to analcime ($NaAlSi_2O_6$), which has the same structure of pollucite ($CsAlSi_2O_6$), indicating that the presence of cesium is required for the structural conversion to pollucite to occur. FIG. 2 shows that by mixing sodium chloride with chabazite and heating the mixture to a temperature above about 700° C., without cesium present, albite or anorthite feldspars are produced.

In the preferred embodiment, the pollucite is further cooled, and, next, heated with glass, including glass frit, and hot pressed at a temperature up to about 725° C. to form a solid pollucite and glass product. Alternatively, glass frit may be added to the CsCl and chabazite prior to heating, which results in lowering the temperature required for conversion to pollucite to about 700° C., by apparently speeding up the reaction time, with no apparent affect on the formation of the pollucite. The reduction in temperature reduces the risk of volatilizing the cesium. The radionuclide cesium is thus encapsulated and immobilized in the solid pollucite and glass product, which is leach resistant and suitable for long term storage.

Figure 3:
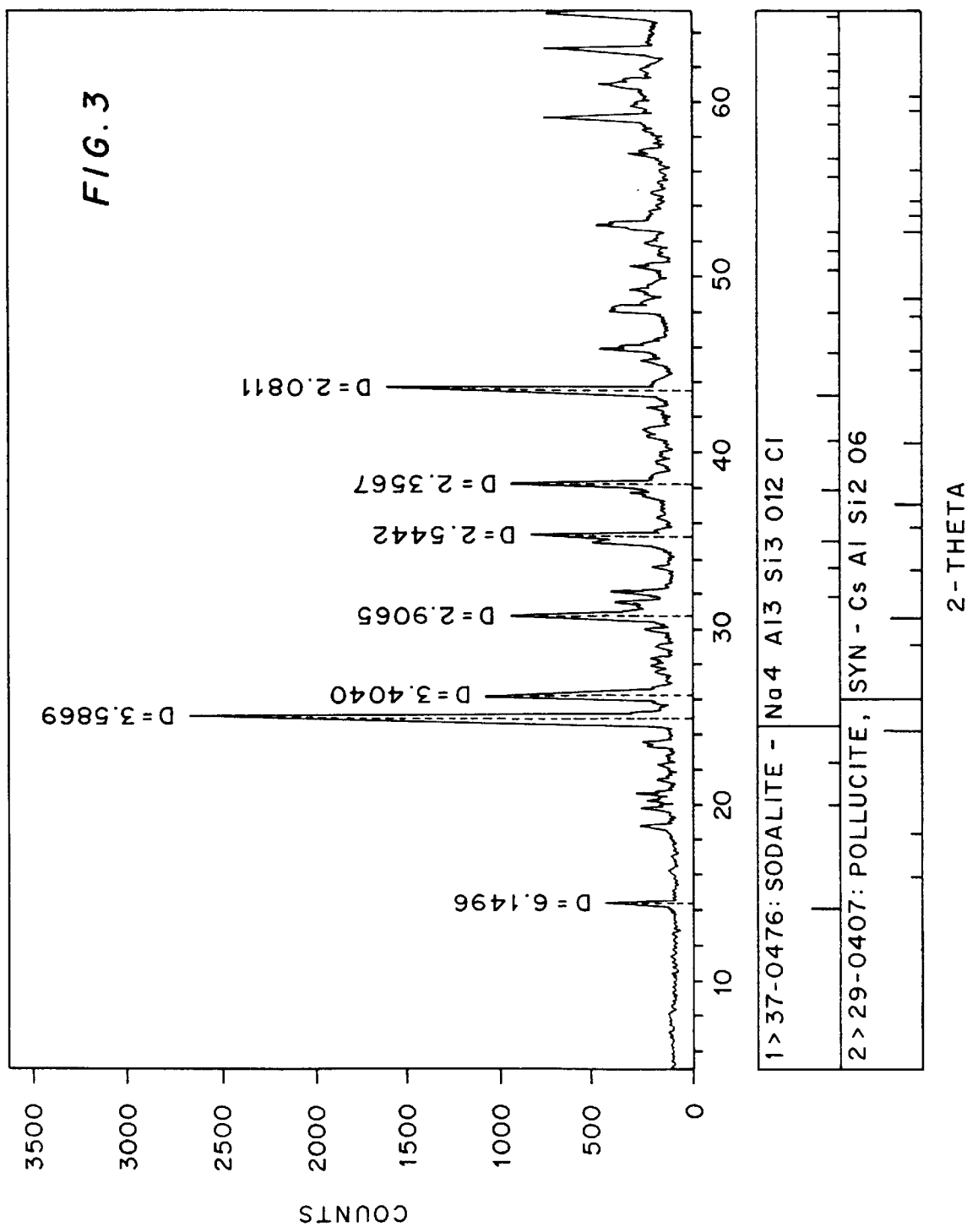
FIG. 3 shows an x-ray diffraction pattern for a sodalite/pollucite product.

In an alternate embodiment, zeolite A is heated with cesium chloride to a temperature above 750° C. Zeolite A shows a partial reaction to pollucite and has a silicon to aluminum ratio of 1. The reaction product is a mixed pollucite ($CsAlSi_2O_6$)-sodalite ($Na_4Al_3Si_3O_{12}Cl$) phase. FIG. 3 shows an x-ray diffraction pattern for the sodalite/pollucite product.

In another embodiment, the retention of cesium in ceramic forms comprised of zeolite A, or zeolite A converted to sodalite, is surprisingly improved by adding up to 10% chabazite by weight to the waste form compositions (either zeolite A containing the radionuclides or zeolite A converted to sodalite containing the radionuclides) prior to their conversion to the final product. This embodiment is particularly applicable to mixed chloride salts having a low concentration of cesium (<2 wt. %).

For example, in a typical electrometallurgical treatment process, the primary component of the salt is an LiCl—KCl eutectic (melting point of 355° C.), containing cesium, strontium, barium, rare earth fission products, and transuranics. One method of producing ceramic waste forms containing the radioactive wastes is to blend zeolite A powder with the waste salt and heat the mixture to trap the fission products within the zeolite A structure in an ion exchange step. The salt-loaded zeolite powder can serve as the waste product, or it can be further heated to a temperature sufficient to convert the salt-loaded zeolite powder to sodalite. Next, the salt-loaded zeolite powder or the resulting sodalite is mixed with glass frit and consolidated by hot isostatic pressing (HIP) at elevated temperatures and pressures to form a composite ceramic. By adding 10% chabazite by weight to the waste products prior to the HIP step, in accordance with this embodiment of the method, the cesium retention in the composite ceramic is significantly improved.

To demonstrate the significant improvement in the cesium retention rates according to this embodiment of the method, a baseline composition was established for the zeolite A and the sodalite waste products, without the addition of chabazite. A 50:50 mixture of a borosilicate glass and zeolite A and a 50:50 mixture of borosilicate glass and sodalite powder were hot pressed under conditions appropriate to retain the crystalline structure of each material. Both the zeolite A and sodalite ceramic compositions showed good retention of fission products based on standard leach tests. However, for both the zeolite A and sodalite ceramic compositions, cesium was the fission product most readily released.

Next, up to 10% chabazite by weight was added to both the zeolite A and the sodalite waste products prior to the HIP step. The chabazite tended to sorb the lower charged alkali and alkaline earth cations to a greater extent than zeolite A during blending, which is, in part, attributable to the higher ratio of silicon to aluminum in chabazite relative to zeolite A, which favors sorption of lower charge species. When the chabazite is added to the powder mixture prior to the HIP cycle but after blending, cesium chloride that is expelled by zeolite A or sodalite during the HIP step can react with chabazite to form pollucite. However, pollucite has not been detected in the diffraction patterns for either the zeolite A or the sodalite waste products. Thus, it is preferable to add the chabazite during the blending step.

Table II below provides leach test data for the baseline ceramic waste forms and ceramic waste forms containing chabazite, for three day and twenty-eight day MCC-1 tests in deionized water at 90° C.

TABLE II

Leach Rate Test Results for Ceramic Waste Forms Containing Chabazite

| Release*<br>Sample | % Cesium<br>Release* | | % Chloride<br>Release* | |
|---|---|---|---|---|
| | 3 day | 28 day | 3 day | 28 day |
| Zeolite Waste Form | | | | |
| 10% Chabazite added | 0.1 | 0.3 | 0.21 | 0.37 |
| Baseline WF Average, without Chabazite | 0.28 | NM | 0.54 | NM |
| Sodalite Waste Form | | | | |
| Chabazite added to Zeolite A prior to in blend | 0.025 | 0.16 | 0.16 | 0.39 |
| 10% Chabazite added after conversion to Sodalite | 0.02 | 0.13 | 0.09 | 0.32 |
| Baseline WF Average, without Chabazite | 0.08 | 0.65 | 0.63 | 0.57 |
| Other Compositions | | | | |
| Chabazite blended with salt, then with Zeolite A | 0.047 | 0.19 | 0.04 | 0.13 |

*% Release = 100*Mass of Species Lost/total Mass of species in Waste Form

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for immobilizing waste chloride salts containing cesium for long term storage, comprising:
    mixing substantially dry, non-aqueous cesium chloride with chabazite; and
    heating the mixture to a temperature sufficient to form a pollucite.

2. The method according to claim 1 wherein the step of heating the mixture includes heating the mixture to a temperature above the melting temperature of cesium chloride.

3. The method according to claim 1 wherein the step of heating the mixture includes heating the mixture to a temperature above about 700° C.

4. The method according to claim 1 further comprising the steps of cooling the pollucite, contacting the pollucite with glass, and heating the glass and pollucite to a temperature sufficient to form a pollucite and glass product.

5. The method according to claim 4 wherein the step of heating the glass and pollucite includes heating the glass and pollucite to a temperature above about 700° C.

6. The method according to claim 4 wherein the glass is borosilicate glass.

7. The method according to claim 4 wherein the glass is initially present as glass frit.

8. The method according to claim 4 wherein the step of heating the glass and pollucite includes hot isostatic pressing.

9. A method for immobilizing waste chloride salts containing cesium for long term storage, comprising:
    mixing non-aqueous cesium chloride with zeolite A; and
    heating the cesium chloride and zeolite to a temperature sufficient to form a product comprised of pollucite and sodalite.

10. The method according to claim 9 wherein the cesium chloride and zeolite are heated to a temperature of above about 700° C.

11. A method for improving the retention of cesium in waste products, comprising:
    blending and heating zeolite with a waste chloride salt to trap the waste chloride salt ions within the zeolite structure to form a salt-loaded zeolite;
    adding chabazite;
    combining the salt-loaded zeolite and chabazite with glass; and
    heating and pressurizing the combination to form a ceramic composite.

12. The method according to claim 11, wherein the step of adding the chabazite includes adding 10% by weight chabazite.

13. The method according to claim 11, wherein the chabazite is added during the blending of the waste chloride salt and the zeolite.

14. The method according to claim 11, wherein the chabazite is added after the blending of the waste chloride salt and the zeolite, and prior to heating the zeolite and waste chloride salt.

15. The method according to claim 11, wherein the zeolite is zeolite A.

16. A method for improving the retention of cesium in waste products, comprising:

blending and heating zeolite with a waste chloride salt to trap the waste chloride salt ions within the zeolite structure to form a salt-loaded zeolite;

heating the salt-loaded zeolite to a temperature sufficient to form sodalite;

adding chabazite;

combining the sodalite zeolite and chabazite with glass; and heating and pressurizing the combination to form a ceramic composite.

17. The method according to claim 16 wherein the step of adding the chabazite includes adding 10% by weight chabazite.

18. The method according to claim 16 wherein the zeolite is zeolite A.

* * * * *